United States Patent
Katano

(10) Patent No.: US 9,223,146 B2
(45) Date of Patent: Dec. 29, 2015

(54) OPTICAL APPARATUS AND IMAGE-PICKUP APPARATUS INCLUDING THE SAME

(71) Applicant: CANON KABUSHIKI KAISHA, Tokyo (JP)

(72) Inventor: Kenichi Katano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/041,441

(22) Filed: Sep. 30, 2013

(65) Prior Publication Data

US 2014/0099088 A1 Apr. 10, 2014

(30) Foreign Application Priority Data

Oct. 4, 2012 (JP) ................... 2012-222293

(51) Int. Cl.
*G03B 17/00* (2006.01)
*G02B 27/64* (2006.01)
*G02B 7/10* (2006.01)

(52) U.S. Cl.
CPC .............. *G02B 27/646* (2013.01); *G02B 7/102* (2013.01)

(58) Field of Classification Search
USPC .......................................................... 396/55
See application file for complete search history.

(56) References Cited

U.S. PATENT DOCUMENTS

| 7,835,635 | B2 * | 11/2010 | Honjo et al. ..................... 396/55 |
| 8,159,542 | B2 * | 4/2012 | Honjo et al. ............... 348/208.4 |
| 2004/0201707 | A1* | 10/2004 | Noguchi et al. ........... 348/208.7 |
| 2010/0232034 | A1* | 9/2010 | Polyakov et al. ............. 359/694 |
| 2011/0115966 | A1* | 5/2011 | Ueda et al. ..................... 348/345 |
| 2011/0273785 | A1* | 11/2011 | Hatakeyama ................. 359/739 |
| 2011/0317990 | A1* | 12/2011 | Imafuji ......................... 396/133 |
| 2012/0070138 | A1* | 3/2012 | Onishi et al. .................... 396/55 |
| 2012/0194796 | A1* | 8/2012 | Nakajima et al. ............... 355/71 |
| 2012/0218636 | A1* | 8/2012 | Suzuka ......................... 359/554 |
| 2012/0287516 | A1* | 11/2012 | Nakajima et al. ............. 359/738 |
| 2013/0300913 | A1* | 11/2013 | Sakai ............................ 348/344 |

FOREIGN PATENT DOCUMENTS

| JP | 2007-094074 A | 4/2007 |
| JP | 2011-033981 A | 2/2011 |

* cited by examiner

*Primary Examiner* — Clayton E Laballe
*Assistant Examiner* — Linda B Smith
(74) *Attorney, Agent, or Firm* — Cowan, Liebowitz & Latman, P.C.

(57) ABSTRACT

An optical apparatus includes an image stabilizer configured to drive a first optical member in a direction perpendicular to an optical axis and to stabilize an image, a light amount adjuster that includes a plurality of blades, and is configured to change a diameter of an aperture configured to transmit a light flux, by rotating the blades, a driver configured to drive the light amount adjuster in the direction perpendicular to the optical axis, and a controller configured to control a driving amount of the driver in accordance with a driving amount of the image stabilizer. The controller drives the image stabilizer and the light amount adjuster in equal directions.

11 Claims, 14 Drawing Sheets

OPTICAL APPARATUS AND IMAGE-PICKUP APPARATUS INCLUDING THE SAME

BACKGROUND OF THE INVENTION

1. Field of the Invention

The present invention relates to an optical apparatus and an image-pickup apparatus including the same, and especially to a light amount adjuster and an image stabilizer of an optical apparatus.

2. Description of the Related Art

Japanese Patent Laid-open No. ("JP") 2011-33981 discloses a configuration in which a diaphragm unit having a light amount adjusting function is disposed in front of an optical image stabilizer configured to shift a lens (an image stabilizing lens) as a part of an image-pickup optical system in a direction perpendicular to an optical axis in synchronization with an apparatus vibration. JP 2011-33981 further discloses inserting the image stabilizing lens into a space inside the diaphragm aperture, in order to make the length of the lens barrel in the optical axis direction as short as possible when it is not being used.

JP 2007-94074 discloses a light amount adjuster in which a blade having a curved shape approximated to a lens curved surface is disposed in between a first lens and a second lens, when a part of the second lens having a convex shape is inserted into a part of the first lens having a concave shape in the retracted lens barrel. In JP 2007-94074, even when the light amount adjuster is disposed in between the first lens and the second lens, a low profile in an optical axis direction may be achieved since the first lens and the second lens come closer to each other to a point where a part of the second lens sinks into a part of the first lens when the lens barrel is retracted.

JP 2011-33981 stabilizes an image by making an optical image stabilizer shift an image stabilizing lens in a direction perpendicular to the optical axis. However, a diaphragm unit having a light amount adjusting function does not shift in the direction perpendicular to the optical axis even when the image stabilizer is driven. Accordingly, when the image stabilizing lens shifts in the direction perpendicular to the optical axis, the optical axis of the image stabilizing lens shifts from the center of the diaphragm diameter. Especially, as a shift amount of the image stabilizing lens increases, a peripheral light amount decreases and the image is deteriorated.

JP 2007-94074 does not disclose a second lens adjacent to a rear side (on an image plane side) of a blade to have a function as an image stabilizing lens. However, when assuming that the second lens functions as an image stabilizing lens configured to move in the direction perpendicular to the optical axis in the image stabilization, it is difficult to sufficiently secure the clearance between the image stabilizing lens and a diaphragm blade having a curved shape approximated to the lens curved surface of the image stabilizing lens. Accordingly, an image stabilizing amount by the image stabilizing lens is limited, and a sufficient image stabilizing performance cannot be secured.

BRIEF SUMMARY OF THE INVENTION

The present invention provides an optical apparatus and an image-pickup apparatus having the same, which can sufficiently secure an image stabilizing performance in image stabilizations, while maintaining the image quality.

An optical apparatus according to the present invention includes an image stabilizer configured to drive a first optical member in a direction perpendicular to an optical axis and to stabilize an image, a light amount adjuster that includes a plurality of blades, and is configured to change a diameter of an aperture configured to transmit a light flux, by rotating the blades, a driver configured to drive the light amount adjuster in the direction perpendicular to the optical axis; and a controller configured to control a driving amount of the driver in accordance with a driving amount of the image stabilizer, wherein the controller drives the image stabilizer and the light amount adjuster in equal directions.

DETAILED DESCRIPTION OF THE EMBODIMENTS

A description will now be given of an optical apparatus according to a first embodiment of the present invention, with reference to FIGS. 1-8.

First Embodiment

Figure 1:
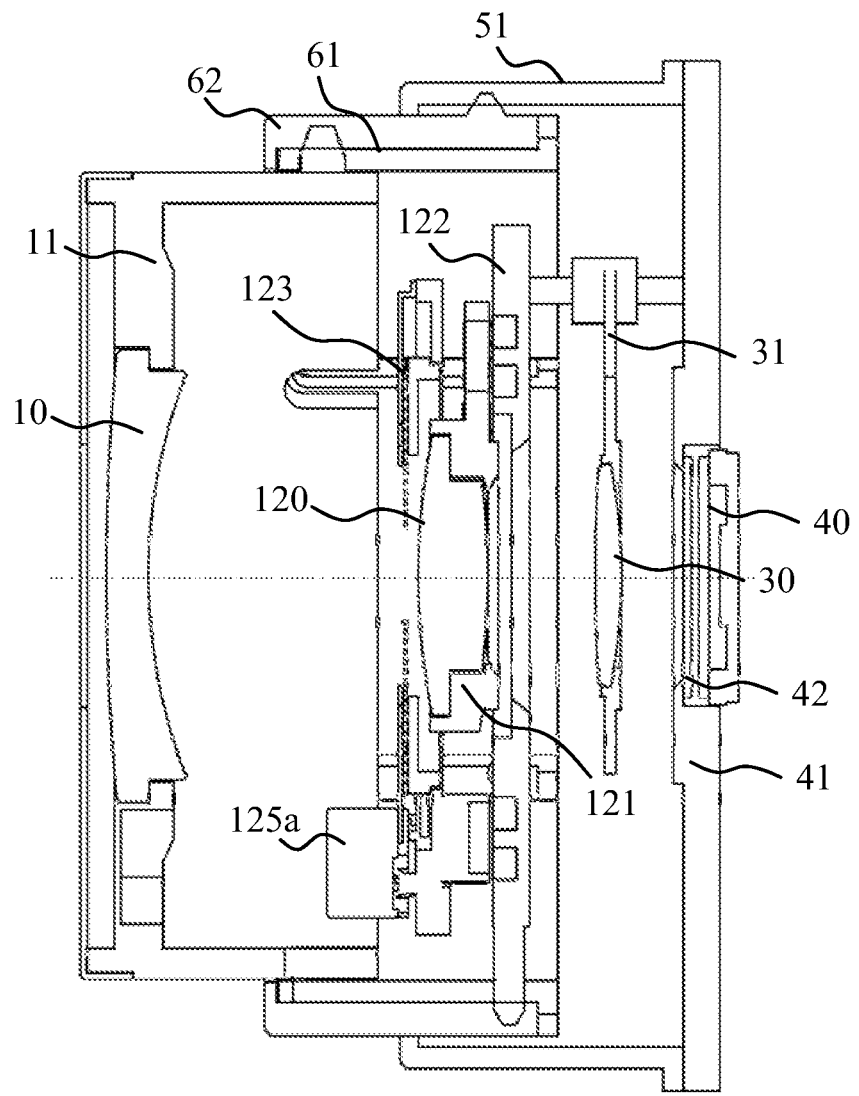
FIG. 1 is a barrel sectional view in image pickup (in a wide-angle state) of an optical apparatus according to a first embodiment of the present invention.
Figure 2:
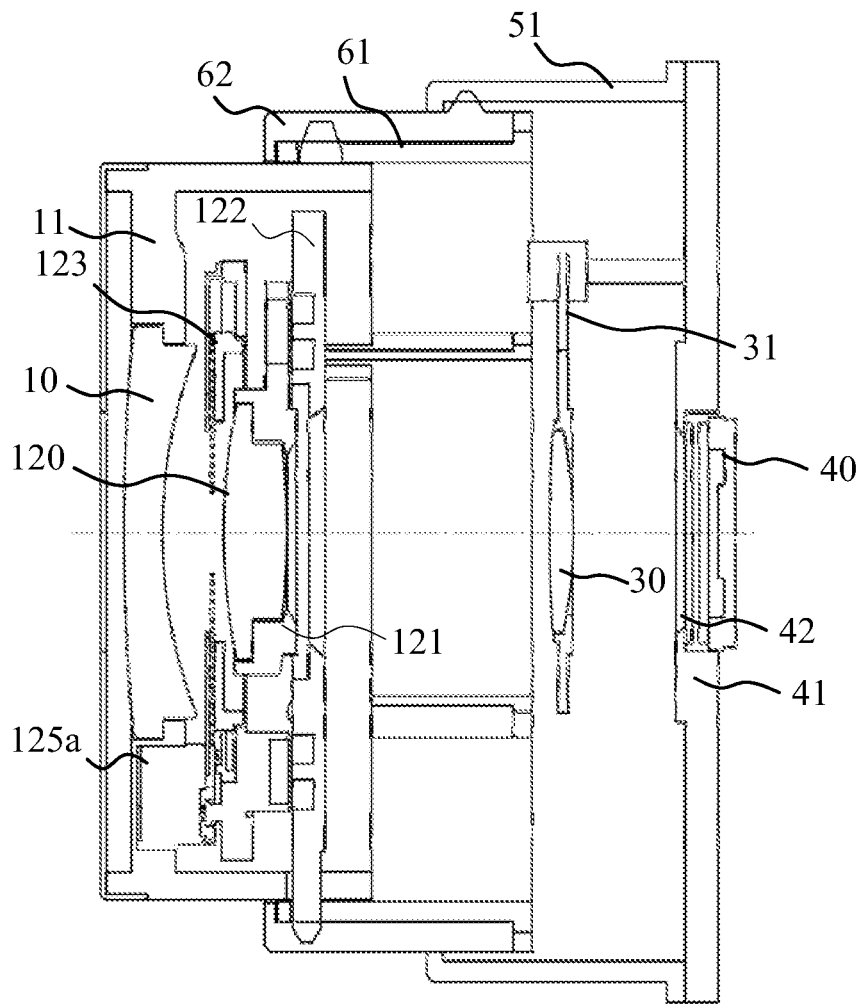
FIG. 2 is a barrel sectional view in the image pickup (in a telephoto state) of the optical apparatus according to the first embodiment of the present invention.
Figure 3:
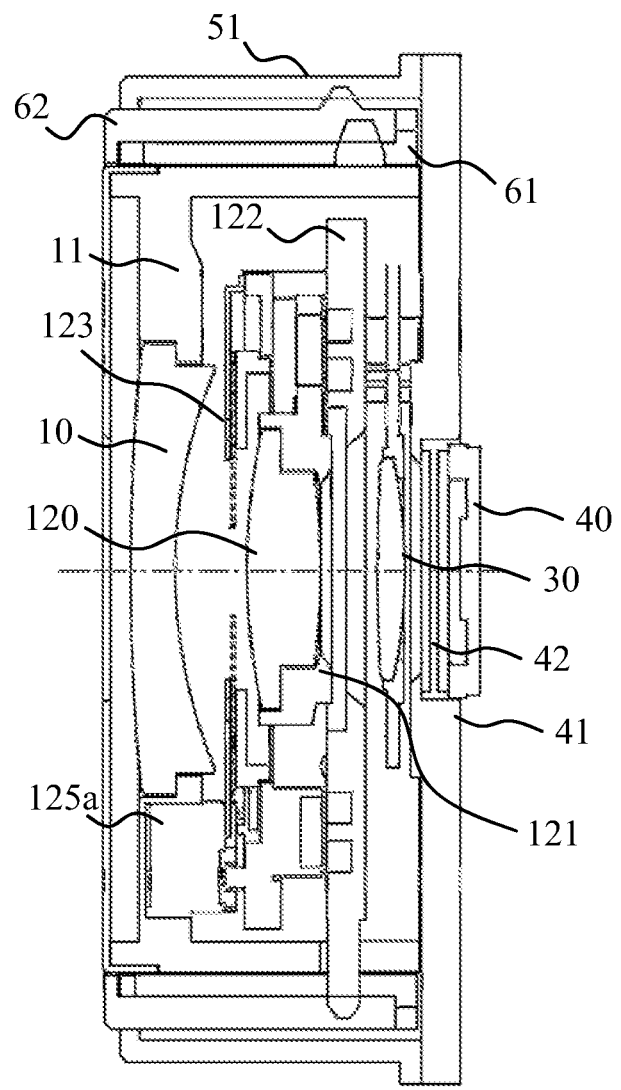
FIG. 3 is a barrel sectional view of the retracted optical apparatus according to the first embodiment of the present invention.
Figure 4:
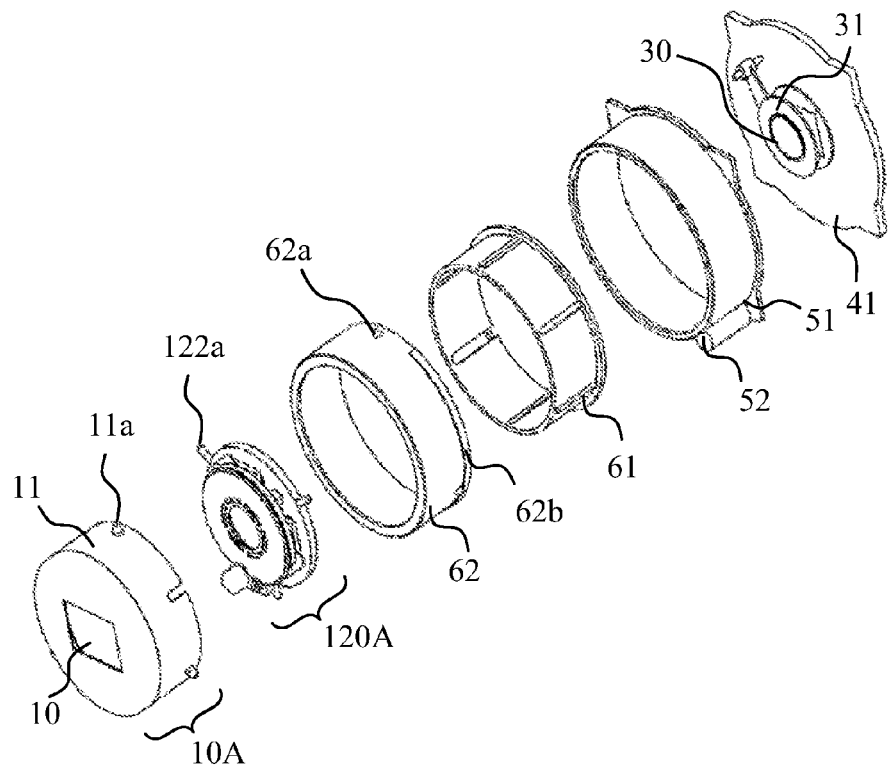
FIG. 4 is a barrel exploded perspective view of the optical apparatus according to the first embodiment of the present invention.
Figure 5:
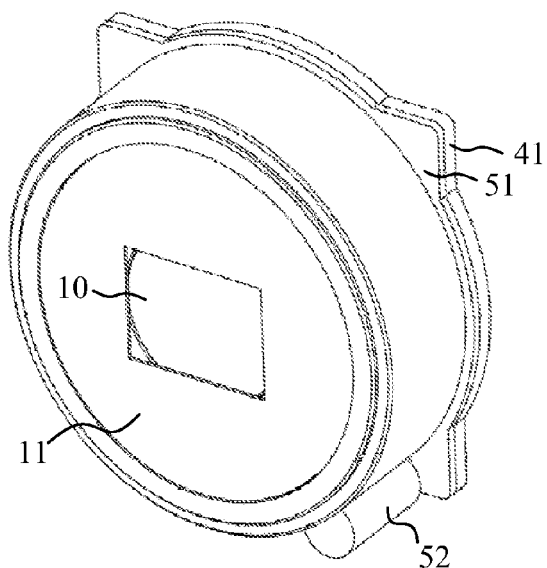
FIG. 5 is a perspective view of the optical apparatus according to the first and second embodiments of the present invention.

FIGS. 1 and 2 are barrel sectional views in image pickup of a lens barrel (an optical apparatus) provided in an image-pickup apparatus such as a compact digital camera, a single-lens reflex camera, a video camera, and the like, according to a first embodiment. In this embodiment, a lens-integrated image-pickup apparatus is used as an example, although the present invention is not limited to it, and is applicable to a lens interchangeable type image-pickup apparatus, or a so-called interchangeable lens in an interchangeable lens system. FIG. 1 is a view of the barrel in a wide-angle state, and FIG. 2 is a view of the barrel in a telephoto state. As illustrated in FIG. 2, in the telephoto state of the barrel, a distance between a lens 10 closest to the object and a lens 120 adjacent to the lens 10 is made as short as possible. Thereby, the barrel can be made compact in size and can have higher magnification. FIG. 3 is a sectional view of the retracted barrel. FIG. 4 is a barrel exploded perspective view of the optical apparatus according to the first embodiment, and FIG. 5 is a perspective view of an illustrative optical apparatus according to the first embodiment.

As illustrated in FIGS. 1-3, the barrel of the first embodiment includes three photographing lens units. A first unit lens 10 is held by a first unit barrel 11, a second unit lens 120 is held by a second unit holder 121, and the third unit lens 30 is held by a third unit holder 31. The first unit lens 10, the second unit lens 120, and the third unit lens 30 are supplied with a power by a focus motor (not illustrated), and are configured so as to be movable in the optical axis direction. An image sensor 40 is held by a sensor holder 41 together with a filter 42.

The barrel of the first embodiment has a 2-stage configuration, and can change the entire length thereof in the image pickup during the retraction. However, the lens barrel of the present invention is not limited to such 2-stage configuration, and may take configurations of 3 or more stages.

A detailed description will now be given of a configuration of the barrel according to this embodiment.

As illustrated in FIGS. 1-4, a fixed barrel 51 holds a gear 52. The gear 52 meshes with a gear 62b of a cam barrel 62, transmits a power of a zoom motor (which is not illustrated in this embodiment) to the cam barrel 62, and rotates the cam barrel 62. A cam groove (which is not illustrated in this embodiment) is provided in an inner surface of the fixed barrel 51, which is engaged with a cam pin 62a of the cam barrel 62. Accordingly, the cam barrel 62 moves back and forth in the optical axis direction as the cam barrel 62 rotates.

A linear movement of a linearly-moving barrel 61 is guided by the fixed barrel 51, and the linearly-moving barrel 61 is configured to move back and forth in synchronization with the movement of the cam barrel 62 in the optical axis direction.

A first unit 10A includes the first unit lens 10 (a second optical member) having a curved shape concave to a light amount adjuster side, and the first unit barrel 11 configured to hold the first unit lens 10. A cam pin 11a is provided in the outer periphery of the first unit barrel 11, which is engaged with a cam groove (which is not illustrated in this embodiment) provided in the inner surface of the cam barrel 62. The first unit barrel 11 is engaged with the linearly-moving barrel 61 and its linear movement is guided. Accordingly, the first unit 10A can move back and forth in the optical axis direction along with the cam lift of the cam barrel 62.

Figure 16:
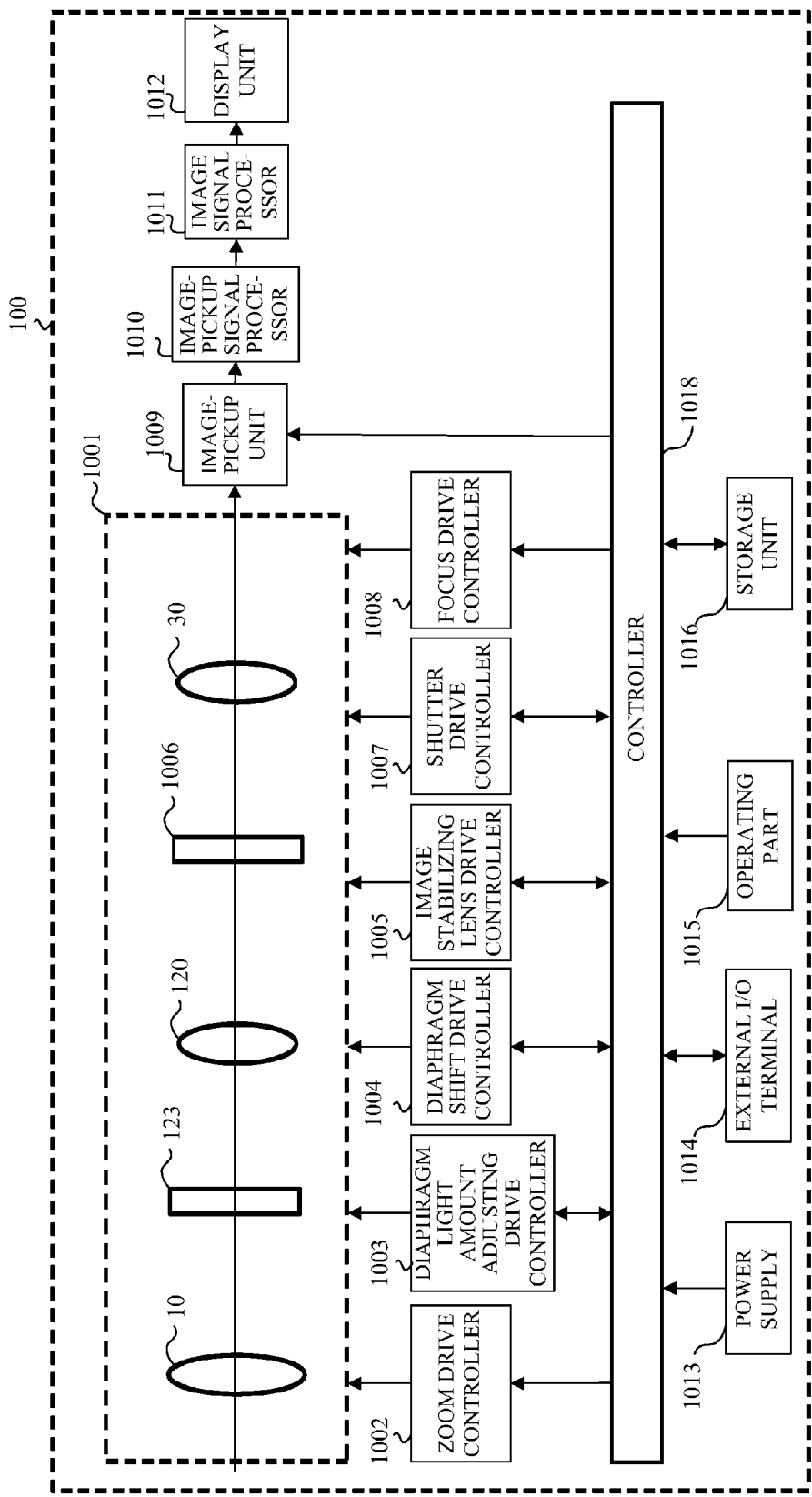
FIG. 16 is a block diagram of an image-pickup apparatus according to the first and the second embodiments of the present invention.

A second unit 120A includes the second unit lens 120 (a first optical member, an image stabilizing lens) having a curved shape convex to the light amount adjuster side, a second unit holder 121 configured to hold the second unit lens 120, a second unit base 122, a diaphragm unit (a diaphragm, a light amount adjuster) 123, and the like. In FIG. 16, which will be described later, a shutter unit 1006 is provided in the second unit 120A. However, since the diaphragm unit 123 may have a shutter function, it is optional to provide the shutter unit 1006 in the second unit 120A.

The diaphragm (a light amount adjuster) 123 is disposed adjacent to and in front of the second unit lens 120 (on an object side), and includes a plurality of diaphragm blades. The diaphragm unit 123 rotates the plurality of diaphragm blades to change a diameter of an aperture configured to transmit a light flux. Thereby, an amount of the incident light may be adjusted. The first unit lens 10 is disposed adjacent to the diaphragm unit 123 on the object side. A cam pin 122a is provided in the outer periphery of the second unit base 122, which is engaged with a cam groove (which is not illustrated in this embodiment) provided in the inner surface of the cam barrel 62. The second unit base 122 is engaged with the linearly-moving barrel 61 and its linear movement is guided. Accordingly, the second unit 120A can move back and forth in the optical axis direction along with the cam lift of the cam barrel 62.

Figure 6:
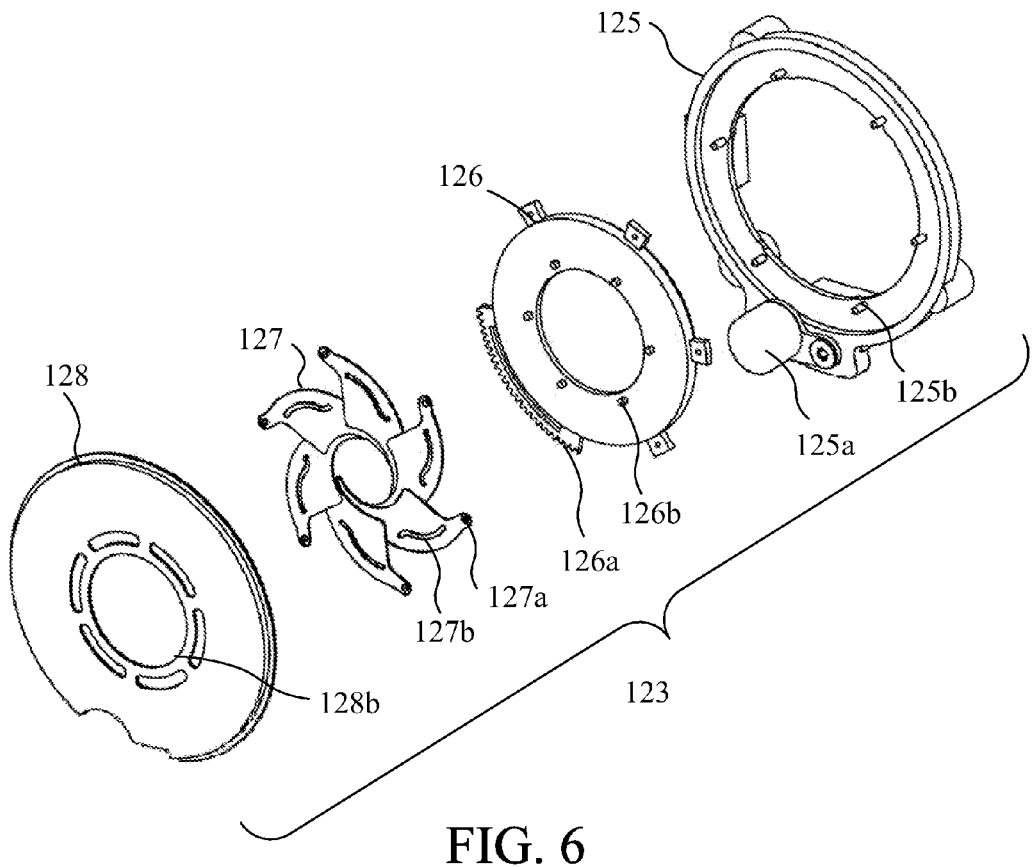
FIG. 6 is a perspective view of a diaphragm according to the first embodiment of the present invention.
Figure 7:
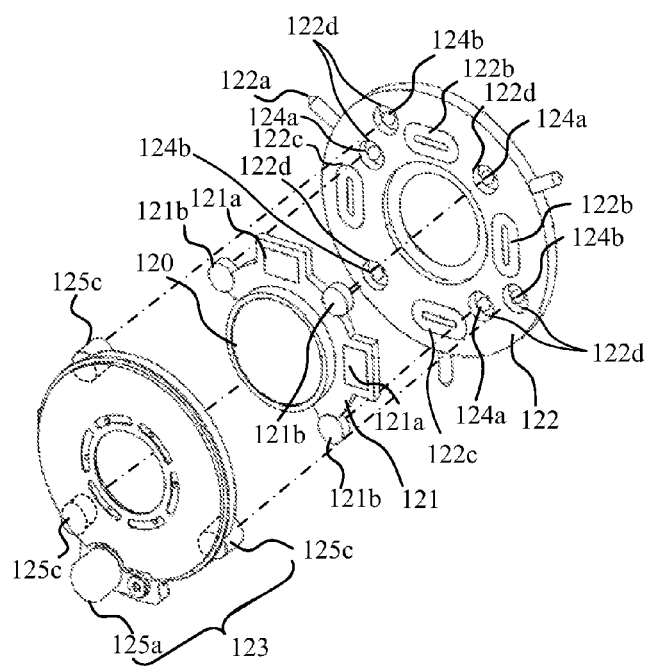
FIG. 7 is a perspective view of a second unit according to the first embodiment of the present invention.
Figure 8:
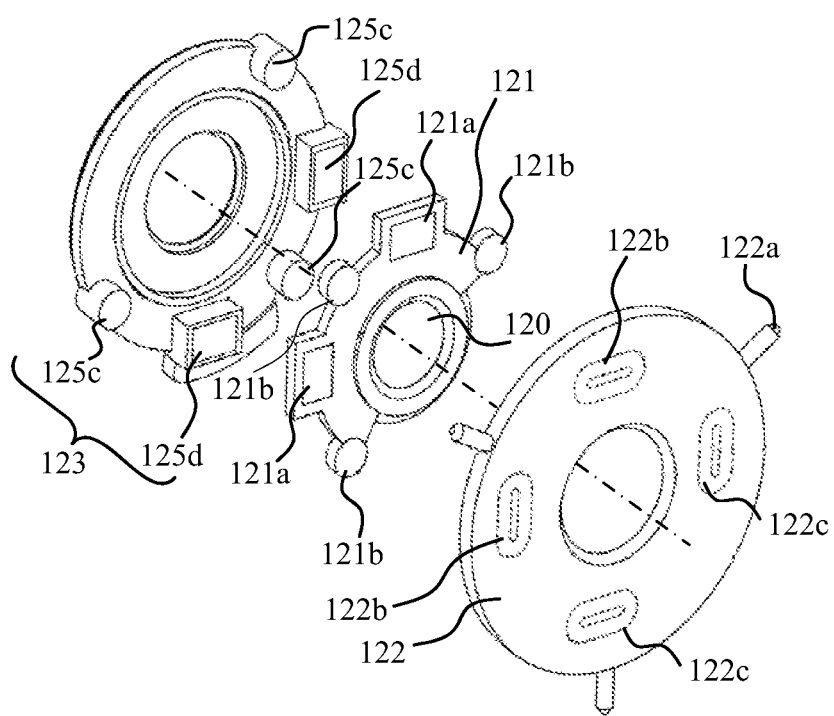
FIG. 8 is another perspective view of the second unit according to the first embodiment of the present invention.

A detailed description will now be given of the second unit 120A and the diaphragm unit 123 according to the first embodiment. FIG. 6 is an exploded perspective view of the diaphragm unit 123 provided in the second unit 120A according to the first embodiment. FIGS. 7 and 8 are detailed perspective views of the second unit 120A in the optical apparatus according to the first embodiment. FIG. 7 is a front perspective view in which the second unit 120A is viewed from the front side (on the object side), and FIG. 8 is a rear perspective view in which the second unit 120A is viewed from the rear side (on the image plane side).

The second unit holder 121 holds the second unit lens 120, and includes two (a pair of) magnets 121a disposed by forming angles of approximately 90 degrees, and three ball receivers 121b.

The second unit base 122 includes two pairs of coils disposed evenly by forming angles of approximately 90 degrees, which are two (a pair of) coils 122b and two (a pair of) coils 122c; and six concave ball receivers 122d.

The diaphragm unit 123 includes a diaphragm bottom plate 125, a diaphragm driving ring 126, diaphragm blades 127, and a diaphragm cover 128.

The diaphragm bottom plate 125 holds a motor 125a configured to operate the diaphragm driving ring 126. The motor 125a is disposed on the object side of the diaphragm bottom plate 125, at an area where the magnets 121a and coils 122b which are to be the power source of the image stabilizer are not disposed. In other words, the motor 125a is disposed on the opposite side of the magnets 121a and the coils 122b with the optical axis placed in between. As illustrated in FIGS. 2 and 3, in a zoom position in which the second unit 120A is arranged most closely to the first unit 10A (or in a retracted state), the motor 125a is positioned in a space at the side surface of the first unit lens 10. In other words, in a zoom position in which the second unit 120A is arranged most closely to the first unit 10A (or in a retracted state), the motor 125a is disposed so that at least a part thereof overlaps the first unit lens 10 in a direction perpendicular to the optical axis.

The diaphragm bottom plate 125 has six dowels 125b, which are fitted to holes 127a that are to be the rotation center of the diaphragm blades 127. The diaphragm bottom plate 125 further includes two (a pair of) magnets 125d disposed by forming angles of approximately 90 degrees, and three ball receivers 125c.

The diaphragm driving ring (driving member) 126 includes a gear 126a configured to transmit a power of the motor 125a, and six dowels 126b which respectively are engaged with elongate holes 127b of the diaphragm blades 127 and move the diaphragm blades 127 in response to the movement of the diaphragm driving ring 126.

The diaphragm blades (the blades) 127 include six identical blades. In this embodiment, each diaphragm blade 127 has a planer shape. The diaphragm cover 128 is provided so as to adjust the position of the diaphragm blades 127 in the optical axis direction, which forms an aperture portion 128b when the diaphragm is in a diaphragm opened state.

A description will now be given of a relationship between the second unit holder 121 and the second unit base 122 configuring the image stabilizer. The magnets (the image stabilizers) 121a of the second unit holder 121 face the coils (the image stabilizers) 122b of the second unit base 122. The ball receivers 121b of the second unit holder 121 face the three balls 124a placed in the ball receivers 122d of the second unit base 122. Thereby, the balls 124a are sandwiched by the ball receivers 121b and the ball receivers 122d. The second unit holder 121 is pressed to the second unit base 122 with suitable pressure by a first forcing unit (which is not illustrated in this embodiment).

Accordingly, the second unit holder 121 can move smoothly in the surface perpendicular to the optical axis direction with respect to the second unit base 122. The second unit holder 121 may be moved to a desired position in the image stabilization, by an electromagnetic power of the magnets 121a and the coils 122b disposed in a state of facing each other.

A description will now be given of a relationship between the diaphragm unit 123 and the second unit holder 121 in the diaphragm unit configured to move in a direction perpendicular to the optical axis direction.

The magnets (drivers) 125d of the diaphragm bottom plate 125 face the coils (drivers) 122c of the second unit base 122. Here, the magnets 125d of the diaphragm bottom plate 125 are provided on the opposite side of the magnets 121a of the second unit holder 121 with the optical axis placed in between. To be more specific, the magnets 125d are disposed outside of an area where the second unit holder 121 and the second unit lens 120 are disposed, when viewed from the optical axis direction. The magnets 125d and the magnets 121a are disposed so that at least a respective part thereof overlaps each other in the direction perpendicular to the optical axis direction. Accordingly, the coils 122c of the second unit base 122 are also disposed outside of the area where the second unit holder 121 and the second unit lens 120 are disposed, when viewed from the optical axis direction. The coils 122c of the second unit base 122 are provided on the opposite side of the coils 122b of the second unit base 122 with the optical axis placed in between. The ball receivers 125c of the diaphragm bottom plate 125 face the three balls 124b placed in the ball receivers 122d of the second unit base 122. Thereby, the balls 124b are sandwiched by the ball receivers 125c and the ball receivers 122d. According to this embodiment, the balls 124b, and the ball receivers 125c, 122d are disposed at positions more distant from the optical axis than those of the balls 124a, and the ball receivers 121b, 122d. The diaphragm unit 123 is pressed to the second unit base 122 with suitable pressure by a second forcing unit (which is not illustrated in this embodiment, and is different from the forcing unit provided in the second unit holder 121).

Accordingly, the diaphragm unit 123 can move smoothly in the surface perpendicular to the optical axis direction with respect to the second unit base 122. The diaphragm unit 123 may be moved to a desired position in the image stabilization, by an electromagnetic power of the magnets 125d and the coils 122c disposed in a state of facing each other.

Figure 17:
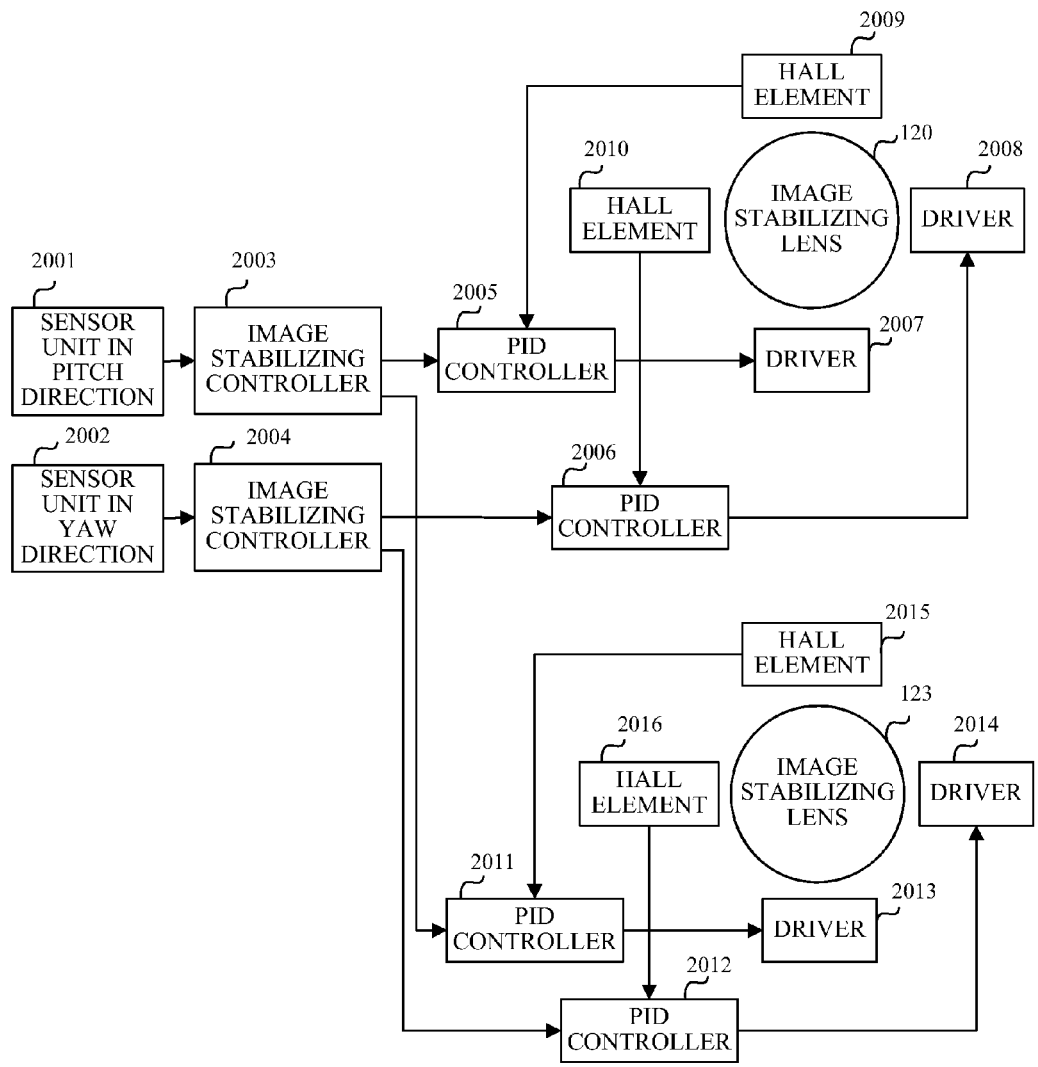
FIG. 17 is another block diagram of an image-pickup apparatus according to the first and the second embodiments of the present invention.
Figure 18:
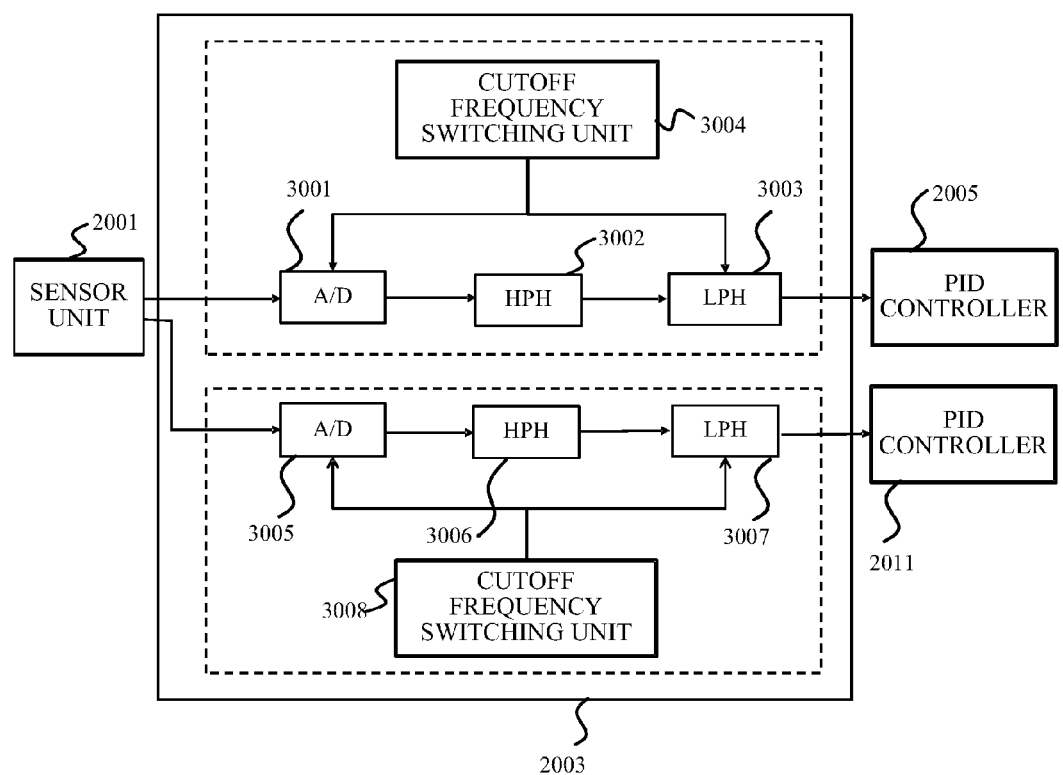
FIG. 18 is still another block diagram of an image-pickup apparatus according to the first and the second embodiments of the present invention.

Next, with reference to FIGS. 16-18, the configuration of an image-pickup apparatus 100 including the optical apparatus according to this embodiment, and control of the second unit holder 121 configuring the image stabilizer and the diaphragm unit 123 configuring the diaphragm mechanism are described.

The image-pickup apparatus 100 according to this embodiment is a digital still camera configured to capture mainly still images. The image-pickup apparatus 100 includes a first mode of performing a photographing operation, and a second mode of not performing a photographing operation. The first mode is, for example, a recording mode (a photographing mode), and the second mode is, for example, a reproducing mode.

A zoom unit (the optical apparatus) 1001 includes a zoom lens configured to provide a magnification variation. Reference number 1002 denotes a zoom drive controller configured to controls drive of the zoom unit 1001. Reference numeral 1003 denotes a diaphragm light amount adjusting drive controller configured to control driving of the diaphragm unit 123. Reference numeral 120 denotes the second unit lens (the image stabilizing lens) configured to change the position thereof with respect to the optical axis. As described above, the image stabilizing lens 120 can be driven in the direction perpendicular to the optical axis. Reference numeral 1004 denotes a diaphragm shift drive controller configured to control driving of the diaphragm unit 123 in the direction perpendicular to the optical axis. Reference numeral 1005 denotes an image stabilizing lens drive controller configured to control driving of the image stabilizing lens 120. Reference numeral 1006 denotes a shutter unit. Reference numeral 1007 denotes a shutter drive controller configured to control driving of the shutter unit 1006. However, as described above, the shutter unit 1006 and the shutter drive controller 1007 are not always but optionally required in this embodiment. Reference numeral 1008 denotes a focus drive controller configured to control driving of a third unit lens 30 (a focus lens). Reference numeral 1009 denotes an image-pickup unit configured to convert an object image formed by the light passing through the optical system (OS, that is, the zoom unit 1001) into an image signal (an analog signal). Reference numeral 1010 denotes an image-pickup signal processor configured to convert the image signal (the analog signal) output from the image-pickup unit 1009 into an image signal (a digital signal). Reference numeral 1011 denotes an image signal processor configured to process the image signal (the digital signal) output from the image-pickup signal processor 1010 according to usage and to generate image data. Reference numeral 1012 denotes a display unit which performs image display as necessary based on the image data output from the image signal processor 1011. Reference numeral 1013 denotes a power supply configured to supply a power to the entire system according to usage. Reference numeral 1014 denotes an external I/O (input/output) terminal configured to input and output communication signals and image signals to and from an external terminal (such as a personal computer). Reference numeral 1015 denotes an operating part to operate the system. Reference numeral 1016 denotes a storage unit configured to store various data such as image data. Reference numeral 1018 denotes a controller configured to control the entire system.

A description will now be given of a schematic operation of the image-pickup apparatus 100 having the above configuration. The operating part 1015 includes a shutter release button (which is not illustrated) configured to turn on a first switch (SW1) and a second switch (SW2) in this order in accordance with a push-in amount. The shutter release button is configured so that when the shutter release button is half pressed, the first switch (SW1) is turned on, and when fully pressed, the second switch (SW2) is turned on. When the first switch (SW1) is turned on, the focus drive controller 1008 drives the third unit lens 30 to perform focus adjustment. The diaphragm light amount adjusting drive controller 1003 and the shutter drive controller 1007 drive and set the diaphragm unit 123 and the shutter unit 1006, respectively, so that suitable exposure amount can be obtained. When the second switch (SW2) is turned on, image data obtained by image signals generated by the image-pickup unit 1009 is stored in the storage unit 1016.

The operating part 1015 further includes an image stabilizing switch (which is not illustrated) configured to select an image stabilizing (vibration prevention) mode. When the image stabilizing mode is selected by the image stabilizing switch, the controller 1018 instructs the image stabilizing lens drive controller 1005 to perform image stabilizing operation. The instructed image stabilizing lens drive controller 1005 performs the image stabilizing operation until being instructed to turn off the image stabilizing. The operating part 1015 further includes a photographing mode selection switch (which is not illustrated) configured to select either one of a still image photographing mode and a moving image photographing mode. Operation conditions of each actuator may be changed in the respective photographing modes. The operating part 1015 further includes a reproducing mode selection switch (which is not illustrated) configured to select a reproducing mode. The image stabilizing operation is stopped during the reproducing mode.

The operating part 1015 further includes a magnification variation switch (which is not illustrated) to perform instruction of zoom magnification variation. When the zoom magnification variation is instructed by the magnification variation switch, the zoom drive controller 1002 which received instruction via the controller 1018 drives the zoom unit 1001, and moves the first unit lens 10, the second unit lens 120, and the third unit lens 30 respectively to the instructed zoom position. Along with such instruction, the focus drive controller 1008 drives the focus lens 30 for focusing based on image information output from the image-pickup unit 1009 and processed by each signal processor (1010, 1011).

Referring now to FIG. 17, a description will be given of configurations of the image stabilizing lens drive controller 1005 and the diaphragm shift drive controller 1004. Reference numeral 2001 denotes a sensor unit (vibration detector) in the pitch direction which detects vibrations in the vertical direction (pitch direction) of the image-pickup apparatus 100 at a normal position (in which a longitudinal direction of an image frame almost coincides with a horizontal direction). The sensor unit 2001 in the pitch direction is, for example, an angular velocity sensor. Reference numeral 2002 denotes a sensor unit (vibration detector) in the yaw direction, and detects vibrations in the horizontal direction (the yaw direction) of the image-pickup apparatus 100 at the normal position. The sensor unit 2002 in the yaw direction is, for example, an angular velocity sensor. Reference numerals 2003, 2004 denotes image stabilizing controllers (determining units) in the pitch direction and in the yaw direction, respectively, and perform the image stabilizing control and image stabilizing lens position control, depending on the situation. The image stabilizing controllers 2003, 2004 respectively determine a target position to be driven so as to cancel image vibrations of an object by the vibrations of the image-pickup apparatus 100, being detected by the sensor units 2001, 2002. The image stabilizing controllers 2003, 2004 further generate stabilized position control signals which indicate the determined target position.

Reference numerals 2005, 2006 of the image stabilizing lens drive controllers 1005 respectively denote a PID (proportional integral derivative) controller configured to obtain a control amount based on the stabilized position control signals and position signals indicating the position of the image stabilizing lens 120, in the respective pitch direction and the yaw direction, and to output position instruction signals. Reference numerals 2007, 2008 respectively denote a driver, configured to drive the image stabilizing lens 120 in the direction perpendicular to the optical axis, based on the position instruction signals transmitted from the PID controllers 2005, 2006. Reference numerals 2009, 2010 respectively denote a Hall element (a position detector) configured to detect the position of the image stabilizing lens 120 in the pitch direction and in the yaw direction.

Similarly, reference numerals 2011, 2012 of the diaphragm shift drive controller 1004 respectively denote a PID controller configured to obtain a control amount based on the stabilized position control signals and position signals indicating the position of the diaphragm unit 123, in the respective pitch direction and the yaw direction, and outputs position instruction signals. Reference numerals 2013, 2014 respectively denote a driver, configured to drive the diaphragm unit 123 in the direction perpendicular to the optical axis, based on the position instruction signals transmitted from the PID controllers 2011, 2012. Reference numerals 2015, 2016 respectively represent a Hall element (a position detector), which detects the position of the diaphragm unit 123 in the pitch direction and in the yaw direction.

Next, the position control of the image stabilizing lens 120 and the diaphragm unit 123 by the image stabilizing lens drive controller 1005 and the diaphragm shift drive controller 1004 illustrated in FIG. 17 is described.

In the position control of the image stabilizing lens 120, the image stabilizing lens 120 is driven in each of the pitch direction and the yaw direction, based on the vibration signals (angular velocity signals) indicating vibrations of the image-pickup apparatus 100 in each direction, detected by the sensor unit 2001 in the pitch direction and the sensor unit 2002 in the yaw direction. The image stabilizing lens 120 includes a magnet, and magnetic field of the magnet is detected by the Hall elements 2009, 2010. The position signals indicating the position of the image stabilizing lens 120 are transmitted respectively to the PID controllers 2005, 2006. The PID controllers (feedback controllers) 2005, 2006 perform feedback control so that such position signals converge to the stabilized position control signals transmitted respectively from the image stabilizing controllers 2003, 2004. The PID controllers 2005, 2006 perform the feedback control of the drivers 2007, 2008 so that the image stabilizing lens 120 is driven to the target position determined by the image stabilizing controllers 2003, 2004, in accordance with the detected position of the image stabilizing lens 120. The PID controllers 2005, 2006 perform the feedback control of the drivers 2007, 2008 so that the image stabilizing lens 120 is driven to the target position changed by the controller 1018. At this time, the PID controllers 2005, 2006 perform PID control in which P control (proportional control), I control (integral control) and D control (derivative control) are combined. The image stabilizing controllers 2003, 2004 respectively output stabilized position control signals so that the position of the image stabilizing lens 120 is moved in a direction of stabilizing the image vibrations, based on vibration information from the sensor unit 2001 in the pitch direction and the sensor unit 2002 in the yaw direction. Accordingly, image vibration can be reduced even when camera vibrates in the image-pickup apparatus 100.

Similarly, in the position control of the diaphragm unit 123, the diaphragm unit 123 is driven in each of the pitch direction and the yaw direction, based on the vibration signals (angular velocity signals) indicating vibrations of the image-pickup apparatus 100 in each direction, detected by the sensor unit 2001 in the pitch direction and the sensor unit 2002 in the yaw direction. The diaphragm unit 123 includes a magnet, and magnetic field of the magnet is detected by the Hall elements 2015, 2016. The position signals indicating the position of the diaphragm unit 123 are transmitted respectively to the PID controllers 2011, 2012. The PID controllers (feedback controllers) 2011, 2012 perform feedback control so that such position signals converge to the stabilized position control signals transmitted respectively from the image stabilizing controllers 2003, 2004. The PID controllers 2011, 2012 perform the feedback control of the drivers 2013, 2014 so that the diaphragm unit 123 is driven to the target position determined by the image stabilizing controllers 2003, 2004, in accordance with the detected position of the diaphragm unit 123. The PID controllers 2011, 2012 perform the feedback control of the drivers 2013, 2014 so that the diaphragm unit 123 is driven to the target position changed by the controller 1018. At this time, the PID controllers 2011, 2012 perform PID control in which P control (proportional control), I control (integral control) and D control (derivative control) are combined. The image stabilizing controllers 2003, 2004 respectively output stabilized position control signals so that the position of the diaphragm unit 123 is moved in a direction of stabilizing the image vibrations, based on vibration information from the sensor unit 2001 in the pitch direction and the sensor unit 2002 in the yaw direction.

This embodiment drives the image stabilizing lens 120 in the direction perpendicular to the optical axis so as to cancel image vibrations of an object in the image stabilization, and also drives the diaphragm unit 123 in the direction perpendicular to the optical axis along with the driving of the image stabilizing lens 120. Accordingly, when the camera vibrates in an image-pickup apparatus and the image stabilizing lens 120 is driven in the direction perpendicular to the optical axis direction, image deterioration caused by a shift of the optical axis of the image stabilizing lens from the center of the diaphragm diameter and a smaller peripheral light amount (reduction of light amount in images due to mechanical vignetting) can be prevented. The image stabilizing lens 120 is less likely to collide with the diaphragm unit 123, and the image stabilizing performance in the optical image stabilizer can be sufficiently secured. Thus, this embodiment can sufficiently secure the image stabilizing performance in the image stabilization, and maintain the image quality.

Referring now to FIG. 18, a description will be given of a configuration of image stabilizing controller 2003. The image stabilizing controller 2004 has a configuration similar to that of the image stabilizing controller 2003, and the description thereof will be omitted.

Reference numerals 3001-3004 denote parts configured to control the image stabilizing lens 120 in the structure of the image stabilizing controller 2003. Reference numeral 3001 denotes an A/D (analog/digital) converter configured to convert an angular velocity signal from the sensor unit 2001 in the pitch direction into a digital signal. Reference numeral 3002 denotes a high-pass filter (HPF), which is a filter configured to vary a cutoff frequency to cut the DC components. Reference numeral 3003 denotes a low-pass filter (LPF) configured to vary a cutoff frequency, and is a filter to convert an angular velocity signal into an angular signal. Reference numeral 3004 denotes a cutoff frequency switching unit of the HPF and LPF. The angular velocity signal input to the image stabilizing controller 2003 undergoes a series of filter processing, and input to the PID controller 2005 as a stabilized position control signal.

Reference numerals 3005-3008 denote parts configured to control the diaphragm unit 123 in the structure of the image stabilizing controller 2003. Reference numeral 3005 denotes an A/D (analog/digital) converter configured to convert an angular velocity signal from the sensor unit 2001 in the pitch direction into a digital signal. Reference numeral 3006 denotes a high-pass filter (HPF), which is a filter configured to vary a cutoff frequency to cut the DC components. Reference numeral 3007 denotes a low-pass filter (LPF) configured to vary a cutoff frequency, and is a filter configured to convert an angular velocity signal into an angular signal. Reference numeral 3008 denotes a cutoff frequency switching unit of the HPF and LPF. The angular velocity signal input to the image stabilizing controller 2003 undergoes a series of filter processing, and input to the PID controller 2011 as a stabilized position control signal.

In this embodiment, the image stabilizing controller 2003 outputs optimal position control information for the vibration signals input to the sensor unit 2001 in the pitch direction, via different filters for the image stabilizing lens 120 and the diaphragm unit 123. The image stabilizing controller 2003 can thereby perform different operations (of moving control in the same direction independently) for the image stabilizing lens 120 and the diaphragm unit 123.

For example, the image stabilizing drive frequency of the image stabilizing lens 120 is set to a relatively high frequency so as to follow the camera shake. On the other hand, the drive frequency of the diaphragm unit 123 has only to be operated so as to prevent the influence from the light amount reduction accompanied with the movement of the image stabilizing lens 120, and need not be set to the same drive frequency as that of the image stabilizing lens 120. For example, the drive frequency of the diaphragm unit 123 may be set to a frequency relatively lower than that of the image stabilizing lens 120. Further, for example, when the image stabilizing movement amount (the driving amount) of the image stabilizing lens 120 is small and there is no problem even when the diaphragm unit 123 is not operated, the center of diaphragm unit 123 may be fixed while only the image stabilizing lens 120 is operated. In other words, the driving amount of the diaphragm unit 123 may be set smaller than that of the image stabilizing lens 120.

As described above, a better operation may be performed for each filter, and a useless operation (electric power) can be omitted in driving the image stabilizing lens 120 and the diaphragm unit 123.

Accordingly, since the diaphragm unit 123 can move in the direction perpendicular to the optical axis as the image stabilizing lens 120 moves in the image stabilization, the image stabilizing amount of the image stabilizing lens 120 may be larger. In other words, even when the image stabilizing amount of the image stabilizing lens 120 increases, the diaphragm unit 123 may be moved by just that much. Failures such as a reduced peripheral light amount and an image deterioration due to the movement of the image stabilizing lens units can be prevented.

In this embodiment, a configuration in which the moving portion of the image stabilizer holds the balls, and the moving portion is driven by an electromagnetic power of the magnets 121a and the coils 122b is adopted. However, the positional relationship of the magnets 121a and the coils 122b may be reversed. Still further, as a modification of this embodiment, a configuration in which two guide bars are used, and two axes are respectively movable, which are driven by two stepping motors, may also be applicable. Such configuration may also be applicable to the driver of the diaphragm unit 123.

Second Embodiment

Figure 9:
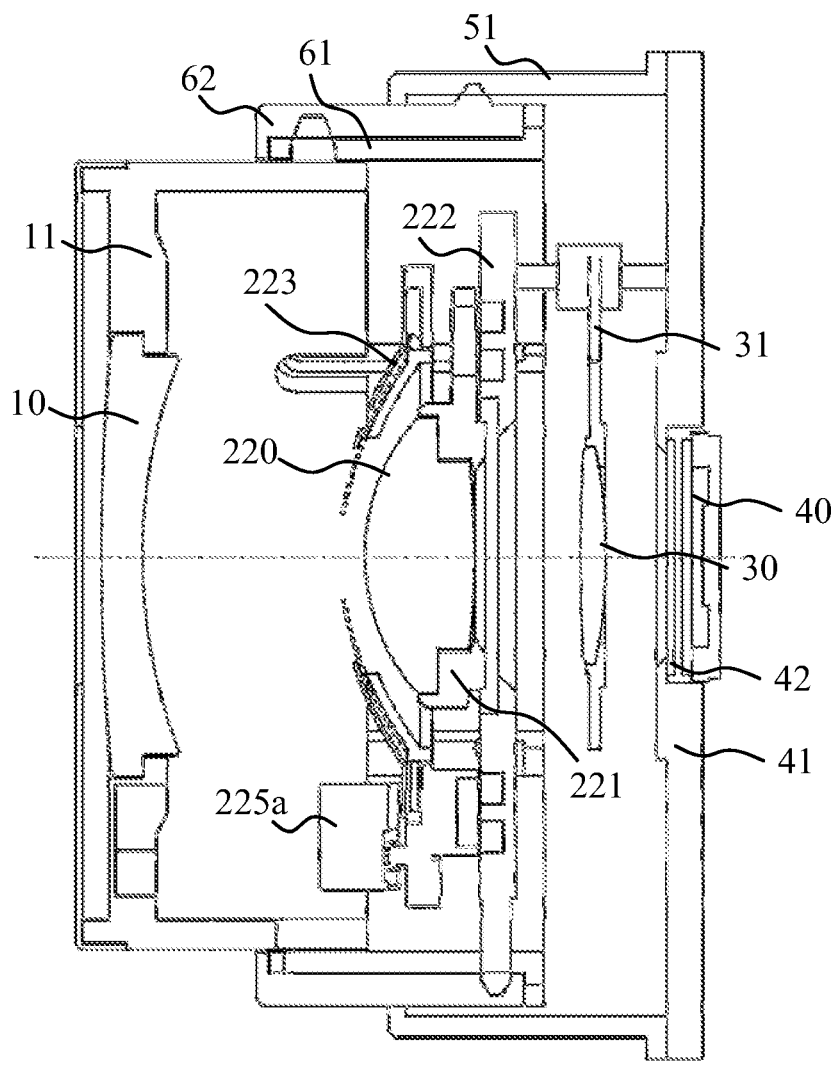
FIG. 9 is a barrel sectional view in image pickup (in a wide-angle state) of an optical apparatus according to a second embodiment of the present invention.
Figure 10:
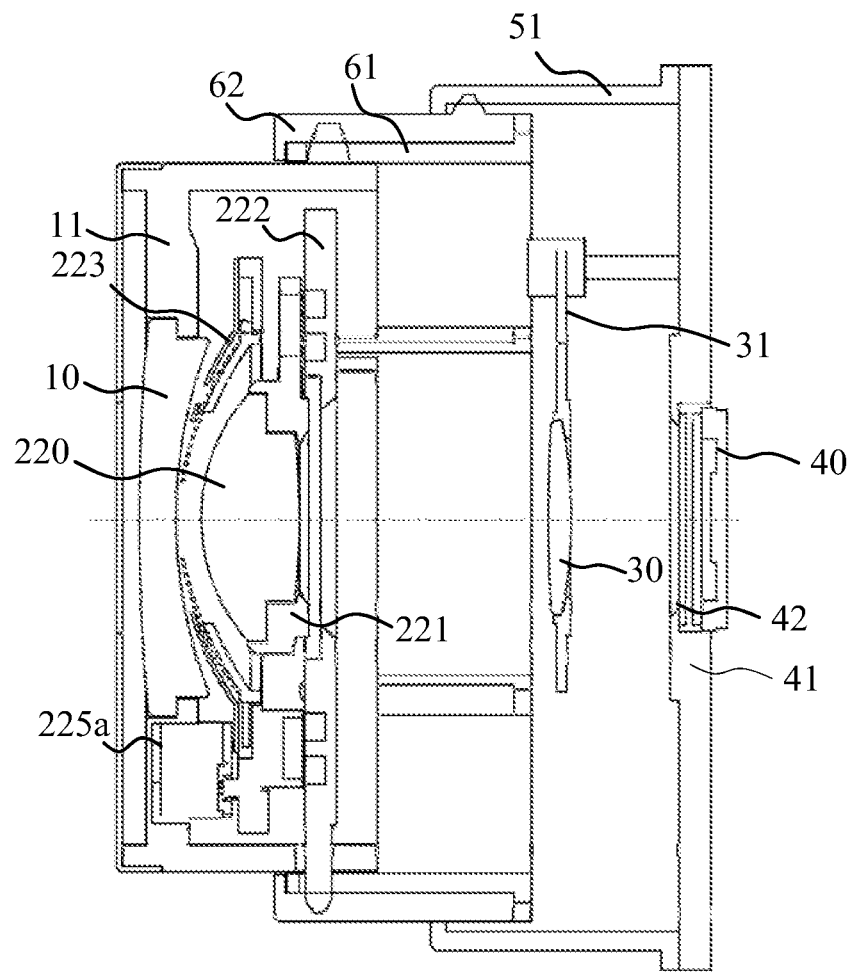
FIG. 10 is a barrel sectional view in the image pickup (in a telephoto state) of the optical apparatus according to the second embodiment of the present invention.
Figure 11:
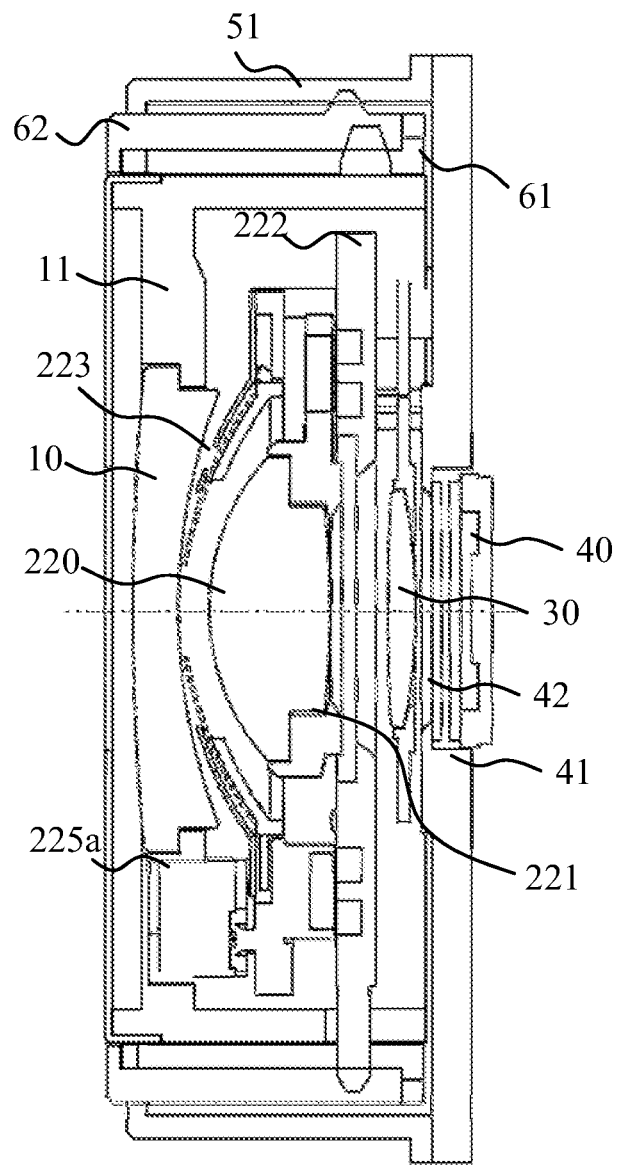
FIG. 11 is a barrel sectional view of the retracted optical apparatus according to the second embodiment of the present invention.
Figure 12:
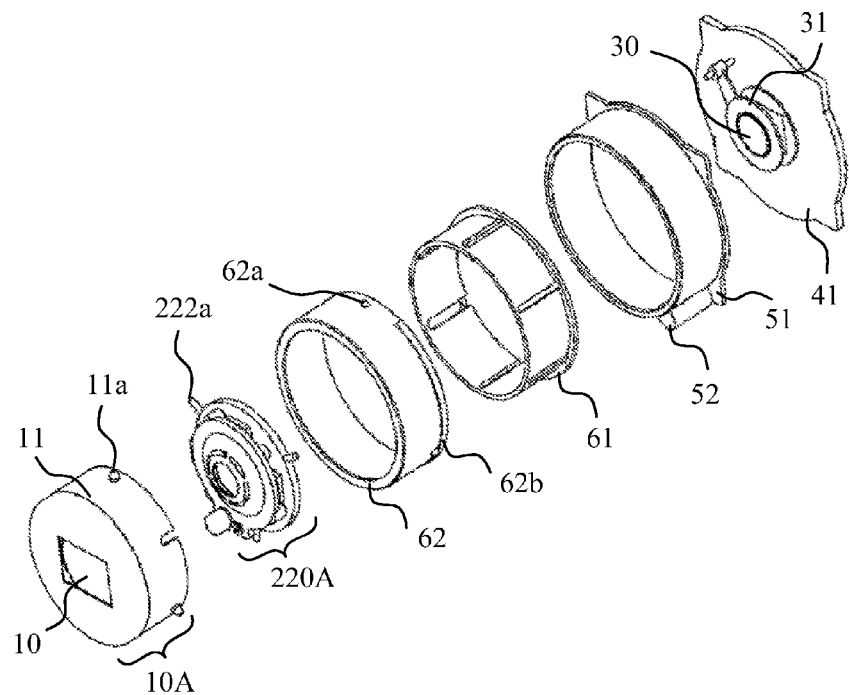
FIG. 12 is a barrel exploded perspective view of the optical apparatus according to the second embodiment of the present invention.

FIGS. 9 and 10 are barrel sectional views in the image pickup of a lens barrel (an optical apparatus) provided in an image-pickup apparatus such as a compact digital camera, a single-lens reflex camera, a video camera, and the like, according to a second embodiment. FIG. 9 is a view of the barrel in a wide-angle state, and FIG. 10 is a view of the barrel in a telephoto state. FIG. 11 is a sectional view of the retracted barrel. FIG. 12 is a barrel exploded perspective view of the optical apparatus according to the second embodiment, and FIG. 5 is a perspective view of an illustrative optical apparatus according to the second embodiment, as well as the first embodiment.

As illustrated in FIGS. 9-11, the barrel of the second embodiment includes three photographing lens units, similarly to the first embodiment. A first unit lens 10 is held by a first unit barrel 11, a second unit lens 220 is held by a second unit holder 221, and the third unit lens 30 is held by a third unit holder 31. The first unit lens 10, the second unit lens 220, and the third unit lens 30 are supplied with a power by a focus motor (not illustrated), and are configured so as to be movable in the optical axis direction. An image sensor 40 is held by a sensor holder 41 together with a filter 42. In this embodiment, as illustrated especially in FIGS. 10 and 11, a part of the second unit lens 220 having a convex shape is inserted into a part of the first unit lens 10 having a concave shape when the lens barrel is in the telephoto state and in the retracted state. In other words, a part of the first unit lens 10 and a part of the second unit lens 220 overlap each other in the direction perpendicular to the optical axis. When a part of the second unit lens 220 is inserted into a part of the first unit lens 10, a diaphragm 223 having a curved shape approximated to that of the lens curved surface is disposed in between the first unit lens 10 and the second unit lens 220. This configuration reduces the thickness of the optical apparatus according to this embodiment in the optical axis direction.

The barrel of the second embodiment has a 2-stage configuration, similarly to the first embodiment.

A detailed description will now be given of the configuration of the barrel according to this embodiment.

As illustrated in FIGS. 9-12, a fixed barrel 51 holds a gear 52. The gear 52 meshes with a gear 62b of a cam barrel 62, transmits a power of a zoom motor (which is not illustrated in this embodiment) to the cam barrel 62, and rotates the cam barrel 62. A cam groove (which is not illustrated in this embodiment) is provided in an inner surface of the fixed barrel 51, which is engaged with a cam pin 62a of the cam barrel 62. Accordingly, the cam barrel 62 moves back and forth in the optical axis direction as the cam barrel 62 rotates.

A linear movement of a linearly-moving barrel 61 is guided by the fixed barrel 51, and the linearly-moving barrel 61 is configured to move back and forth in synchronization with the movement of the cam barrel 62 in the optical axis direction.

A first unit 10A includes the first unit lens 10 (a second optical member) having a curved shape concave to a light amount adjuster side, and the first unit barrel 11 which holds the first unit lens 10. A cam pin 11a is provided in the outer periphery of the first unit barrel 11, which is engaged with a cam groove (which is not illustrated in this embodiment) provided in the inner surface of the cam barrel 62. The first unit barrel 11 is engaged with the linearly-moving barrel 61 and its linear movement is guided. Accordingly, the first unit 10A can move back and forth in the optical axis direction along with the cam lift of the cam barrel 62.

A second unit 220A includes the second unit lens 220 (a first optical member) having a curved shape convex to the light amount adjuster side, a second unit holder 221 configured to hold the second unit lens 220, a second unit base 222, a diaphragm unit (a diaphragm, a light amount adjuster) 223, and the like. A cam pin 222a is provided in the outer periphery of the second unit base 222, and engaged with a cam groove (which is not illustrated in this embodiment) provided in the inner surface of the cam barrel 62. The second unit base 222 is engaged with the linearly-moving barrel 61 and its linear movement is guided. Accordingly, the second unit 220A can move back and forth in the optical axis direction along with the cam lift of the cam barrel 62.

The diaphragm (a light amount adjuster) 223 is disposed adjacent to and in front of the second unit lens 220 (on an object side), and includes a plurality of diaphragm blades. The diaphragm 223 rotates the plurality of diaphragm blades to change a diameter of an aperture configured to transmit a light flux, whereby an amount of incident light may be adjusted. The first unit lens 10 is disposed adjacent to the diaphragm 223 on the object side. The diaphragm 223 has a convex curved shape on the first unit lens 10 side (the second optical element side), and a concave curved shape on the second unit lens 220 side (the first optical element side). In other words, the diaphragm 223 is configured so as to have a curved shape convex to the optical element side having a concave curved shape. In this embodiment, the first unit lens 10 has a concave portion on the light amount adjuster side (on the light amount adjuster side), and the second unit lens 220 has a convex portion on the light amount adjuster side. However, the present invention is not limited to this configuration, and may take a configuration in which the first unit lens 10 has a convex portion on the light amount adjuster side, and the second unit lens 220 has a concave portion on the light amount adjuster side, for example. In other words, modifications may be made as long as either one of the first unit lens 10 and the second unit lens 220 has a curved shape concave to the light amount adjuster side, and the other has a curved shape convex to the light amount adjuster side.

Figure 13:
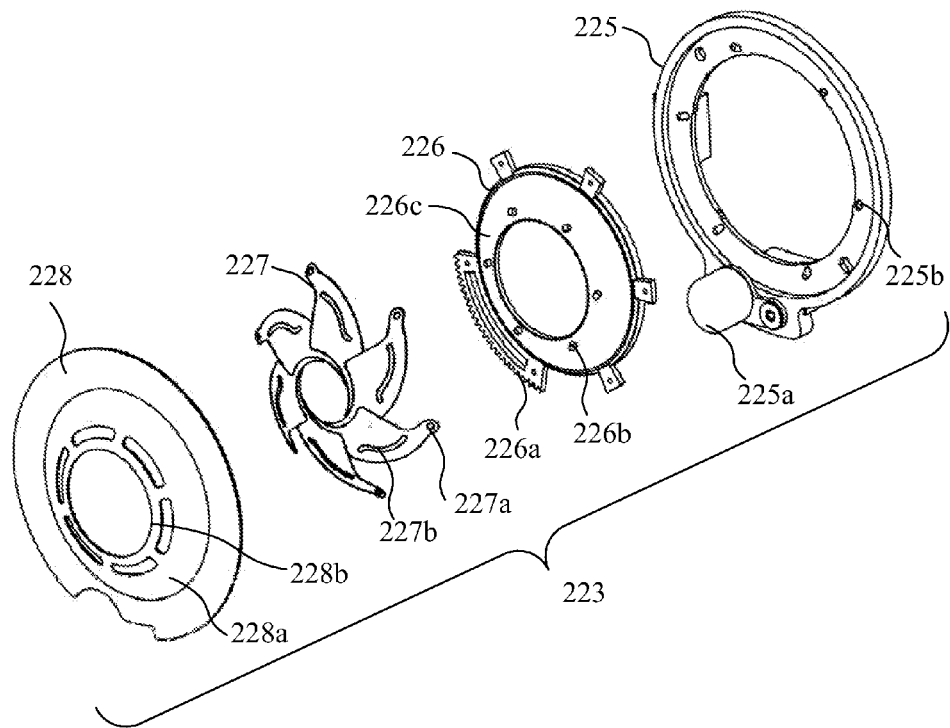
FIG. 13 is a perspective view of a diaphragm according to the second embodiment of the present invention.
Figure 14:
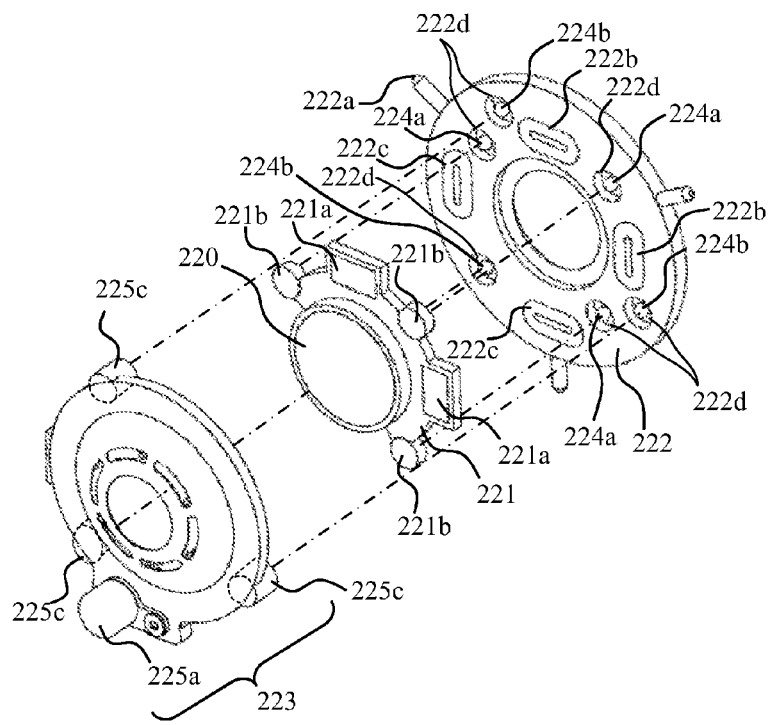
FIG. 14 is a perspective view of a second unit according to the second embodiment of the present invention.
Figure 15:
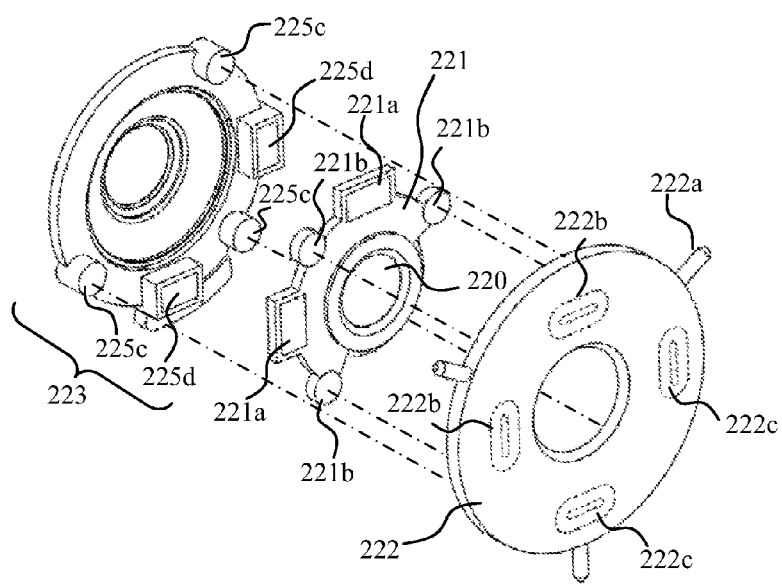
FIG. 15 is another perspective view of the second unit according to the second embodiment of the present invention.

A detailed description will be given of the second unit 220A and the diaphragm 223 according to the second embodiment. FIG. 13 is an exploded perspective view of the diaphragm 223 provided in the second unit 220A according to the second embodiment. FIGS. 14 and 15 are detailed perspective views of the second unit 220A in the optical apparatus according to the second embodiment. FIG. 14 is a front perspective view in which the second unit 220A is viewed from the front side (on the object side), and FIG. 15 is a rear perspective view in which the second unit 220A is viewed from the rear side (on the image plane side).

The second unit holder 221 holds the second unit lens 220, and includes two (a pair of) magnets 221a disposed by forming angles of approximately 90 degrees, and three ball receivers 221b.

The second unit base 222 includes two pairs of coils disposed evenly by forming angles of approximately 90 degrees, which are two (a pair of) coils 222b and two (a pair of) coils 222c, and six concave ball receivers 222d.

The diaphragm 223 includes a diaphragm bottom plate 225, a diaphragm driving ring 226, diaphragm blades 227, and a diaphragm cover 228.

The diaphragm bottom plate 225 holds a motor 225a configured to operate the diaphragm driving ring 226. The motor 225a is disposed on the object side of the diaphragm bottom plate 225, at an area where the magnets 221a and coils 222b which are to be the power source of the image stabilizer are not disposed. In other words, the motor 225a is disposed on the opposite side of the magnets 221a and the coils 222b with the optical axis placed in between. As illustrated in FIGS. 10 and 11, in a zoom position in which the second unit 220A is arranged most closely to the first unit 10A (or in a retracted state), the motor 225a is positioned in a space at the side surface of the first unit lens 10. In other words, in a zoom position in which the second unit 220A is arranged most closely to the first unit 10A (or in a retracted state), the motor 225a is disposed so that at least a part thereof overlaps the first unit lens 10 in a direction perpendicular to the optical axis.

The diaphragm bottom plate 225 has six dowels 225b, which are fitted to holes 227a that are to be the rotation center of the diaphragm blades 227. The diaphragm bottom plate 225 further includes two (a pair of) magnets 225d disposed by forming angles of approximately 90 degrees, and three ball receivers 225c.

The diaphragm driving ring (driving member) 226 includes a gear 226a configured to transmit a power of the motor 225a, and six dowels 226b which respectively are engaged with elongate holes 227b of the diaphragm blades 227 and move the diaphragm blades 227 as the diaphragm driving ring 226 moves. An abutting surface 226c on the front surface of the diaphragm driving ring 226 (on the object side) is a sliding surface with the diaphragm blades 227. In this embodiment, the abutting surface 226c is formed to have a curved shape similar to that of a lens (for example, the second unit lens 220).

The diaphragm blades (the blades) 227 includes six identical blades, and especially the respective portion thereof which blocks light rays is formed to have a convex curved shape (or a curved shape portion) similar to that of the abutting surface 226c of the diaphragm driving ring 226.

The diaphragm cover 228 controls the position of the diaphragm blades 227 in the optical axis direction. An abutting surface 228a on an image plane side which abuts with the diaphragm blades 227 is formed to have a curved shape along the lens curved surface similar to that of the diaphragm blades 227. The diaphragm cover 228 also includes an aperture portion 228b when the diaphragm is in a diaphragm opened state.

The curved surfaces of the diaphragm driving ring 226 (the abutting surface 226c), the diaphragm blades 227, and the diaphragm cover 228 (the abutting surface 228a) may have approximately the same curved surface (curvature radius).

In the diaphragm 223 of the above described configuration, the diaphragm blades 227 move and follow a locus of the elongate holes 227b when the diaphragm driving ring 226 rotates by the driving of the motor 225a, whereby the diameter of the aperture formed by the six diaphragm blades 227 changes. At this time, the six diaphragm blades 227 move while rotating along the curved surface of the diaphragm cover 228 and/or the diaphragm driving ring 226.

The abutting surface 226c of the diaphragm driving ring 226 and the abutting surface 228a of the diaphragm cover 228 have curved shape, as described above, and the diaphragm blades 227 also have a curved shape similar thereto. The curvature radius of the curved surface of the diaphragm blades 227 is set to be in between the curvature radius (the first curvature radius) of the curved surface of the first unit lens 10 and the curvature radius (the second curvature radius) of the curved surface of the second unit lens 220. In order to reduce the thickness in the optical axis direction, the first curvature radius and the second curvature radius may be set to approximately the same value. However, the present invention is not limited to this configuration. This embodiment sets the curvature radius of the curved surface of the diaphragm blades 227 to be smaller than the curvature radius of the curved surface (of the concave portion) of the first unit lens 10, and larger than the curvature radius of the curved surface (of the convex portion) of the second unit lens 220. Herein, the second curvature radius of the curved surface of the second unit lens 220 is smaller than the first curvature radius of the curved surface of the first unit lens 10. In the configuration where the first unit lens 10 has a convex portion on the light amount adjuster side and the second unit lens 220 has a concave portion on the light amount adjuster side, the magnitude relationship of the curvature radii is reversed. In other words, the curvature radius of the curved surface of the diaphragm blades 227 is set to be smaller than the curvature radius of the curved surface (of the concave portion) of the second unit lens 220, and larger than the curvature radius of the curved surface (of the convex portion) of the first unit lens 10. Herein, the curvature radius of the curved surface of the first unit lens 10 is smaller than the curvature radius of the curved surface of the second unit lens 220.

As described above, the diaphragm 223 according to this embodiment is configured so that the six diaphragm blades 227 rotate along the curved surface of the diaphragm cover 228 and/or the diaphragm driving ring 226. Accordingly, even in a telephoto state in the image pickup where a part of the second unit lens 220 sinks into the first unit lens 10, for example, the diaphragm blades 227 of the diaphragm 223 may be driven from an open state to a small diaphragm state, without interfering the first unit lens 10 and the second unit lens 220.

A description will now be given of a relationship between the second unit holder 221 and the second unit base 222 of the image stabilizer. The magnets (the image stabilizers) 221a of the second unit holder 221 face the coils (the image stabilizers) 222b of the second unit base 222. The ball receivers 221b of the second unit holder 221 face the three balls 224a placed in the ball receivers 222d of the second unit base 222, whereby the balls 224a are held by the ball receivers 221b and the ball receivers 222d in a sandwiched manner. The second unit holder 221 is pressed to the second unit base 222 with a suitable pressure by a first forcing unit (which is not illustrated in this embodiment).

Accordingly, the second unit holder 221 can move smoothly in the surface perpendicular to the optical axis direction with respect to the second unit base 222. The second unit holder 221 may be moved to a desired position in the image stabilization, by an electromagnetic power of the magnets 221a and the coils 222b disposed in a state of facing each other.

A description will now be given of a relationship between the diaphragm 223 and the second unit holder 221 of the diaphragm unit configured to move in a direction perpendicular to the optical axis direction.

The magnets (drivers) 225d of the diaphragm bottom plate 225 face the coils (drivers) 222c of the second unit base 222. The magnets 225d of the diaphragm bottom plate 225 are provided on the opposite side of the magnets 221a of the second unit holder 221 with the optical axis placed in between. To be more specific, the magnets 225d are disposed outside of an area where the second unit holder 221 and the second unit lens 220 are disposed, when viewed from the optical axis direction. The magnets 225d and the magnets 221a are disposed so that at least a respective part thereof overlaps each other in the direction perpendicular to the optical axis direction. Accordingly, the coils 222c of the second unit base 222 are also disposed outside of the area where the second unit holder 221 and the second unit lens 220 are disposed, when viewed from the optical axis direction. The coils 222c of the second unit base 222 are provided on the opposite side of the coils 222b of the second unit base 222 with the optical axis placed in between. The ball receivers 225c of the diaphragm bottom plate 225 face the three balls 224b placed in the ball receivers 222d of the second unit base 222, whereby the balls 224b are sandwiched by the ball receivers 225c and the ball receivers 222d. The balls 224b, and the ball receivers 225c, 222d are disposed at positions more distant from the optical axis than those of the balls 224a, and the ball receivers 221b, 222d. The diaphragm 223 is pressed to the second unit base 222 with a suitable pressure by a second forcing unit (which is not illustrated in this embodiment, and is different from the forcing unit provided in the second unit holder 221).

Accordingly, the diaphragm 223 can move smoothly in the surface perpendicular to the optical axis direction with respect to the second unit base 222. The diaphragm 223 may be moved to a desired position, by an electromagnetic power of the magnets 225d and the coils 222c disposed in a state of facing each other.

The configurations of the image-pickup apparatus 100 including the optical apparatus according to the second embodiment, and control of the second unit holder 221 of the image stabilizer and the diaphragm 223 of the diaphragm mechanism are the same as those in the first embodiment, and thus the description thereof will be omitted. However, in this embodiment, when the diaphragm 223 is driven too much in the direction perpendicular to the optical axis where the first unit lens 10 and the second unit lens 220 are arranged most closely to each other, the first unit lens 10 and the diaphragm 223 may collide with each other. Accordingly, when the first unit lens 10 and the second unit lens 220 are arranged most closely to each other (in the telephoto state), the image stabilizing controllers 2003, 2004 may be configured to control the driving amount of the diaphragm 223, and if necessary also the driving amount of the second unit lens 220.

According to this embodiment, the image stabilizing lens 220 is driven in the direction perpendicular to the optical axis so as to cancel image vibration of an object in the image stabilization, and the diaphragm 223 is also driven in the direction perpendicular to the optical axis along with the driving of the image stabilizing lens 220. Accordingly, when the camera vibrates in an image-pickup apparatus and the image stabilizing lens 220 is driven in the direction perpendicular to the optical axis direction, image deterioration, generated by a shift of the optical axis of the image stabilizing lens from the center of the diaphragm diameter and a small peripheral light amount (reduction of light amount in images due to mechanical vignetting), can be prevented. The image stabilizing lens 220 is less likely to collide with the diaphragm 223 in the image stabilization can be reduced. Thereby, the image stabilizing performance in the optical image stabilizer can be sufficiently secured. Thus, this embodiment can sufficiently secure the image stabilizing performance in the image stabilization, and maintains the image quality.

Accordingly, since the diaphragm 223 having a curved surface can move in the direction perpendicular to the optical axis as the image stabilizing lens 220 moves in the image stabilization, the image stabilizing amount of the image stabilizing lens 220 may be larger according to the second embodiment. In other words, even when the image stabilizing amount of the image stabilizing lens 220 increases, the diaphragm 223 may be moved by just that much. Thereby, failures such as peripheral light amount reduction and image deterioration due to the movement of the image stabilizing lens units can be prevented. Accordingly, not only the reduction of the thickness in the optical axis direction can be achieved by the curved diaphragm blades, but also the image stabilizing performance can be sufficiently secured in the image stabilization, while the image deterioration can also be prevented similarly to the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention can sufficiently secure the image stabilizing performance in image stabilizations, and maintains the image quality.

The present invention is applicable to a camera system such as a compact digital camera, a single-lens reflex camera, a video camera, and the like.

This application claims the benefit of Japanese Patent Application No. 2012-222293, filed on Oct. 4, 2012, which is hereby incorporated by reference herein in its entirety.

What is claimed is:

1. An optical apparatus comprising:
    a base member;
    a holding member which holds a first optical member, and is arranged so as to be movable in a direction perpendicular to an optical axis with respect to the base member;
    a diaphragm base member which holds a diaphragm blade, and is arranged so as to be movable in a direction perpendicular to the optical axis with respect to the base member;
    a first driver which drives the holding member in the direction perpendicular to the optical axis;
    a second driver which drives the diaphragm base member in the direction perpendicular to the optical axis;
    a vibration detector which detects vibration of the optical apparatus; and
    a controller which controls the first driver and the second driver in accordance with an output of the vibration detector,
    wherein the controller drives the second driver in a direction which is the same as the driving direction of the first driver.

2. The optical apparatus according to claim 1,
    wherein the diaphragm base member holds a plurality of diaphragm blades, and
    wherein the diaphragm blades respectively have a curved shape portion.

3. The optical apparatus according to claim 1,
    wherein the controller controls the second driver so that a driving amount of the second driver is smaller than a driving amount of the first driver.

4. The optical apparatus according to claim 1, wherein one of the base member and the holding member has a first magnet as part of the first driver,
    wherein another of the base member and the holding member has a first coil as part of the first driver,
    wherein the first magnet and the first coil face each other in the optical axis direction,
    wherein one of the base member and the diaphragm base member has a second magnet as part of the second driver, wherein another of the base member and diaphragm base member has a second coil as part of the second driver, and wherein the second magnet and the second coil face each other in the optical axis direction.

5. The optical apparatus according to claim 1, wherein at least a part of the first driver and a part of the second driver overlap each other in the direction perpendicular to the optical axis.

6. The optical apparatus according to claim 2, further comprising a second optical member disposed on an object side of the first optical member, wherein the first optical member and the second optical member are disposed adjacent to each other in an optical axis direction so that a concave curved surface formed on the first optical member and a convex curved surface of the second optical member face each other, and wherein the diaphragm blades respectively have a convex curved shape which is set in accordance with a curvature of the concave curved surface and a curvature of the convex curved surface.

7. The optical apparatus according to claim 4, wherein the first magnet and the second magnet are arranged so that the first magnet and the second magnet do not overlap each other in the optical axis direction, wherein the first coil and the second coil are arranged so that the first coil and the second coil do not overlap each other in the optical axis direction.

8. The optical apparatus according to claim 6, further comprising:

a driving member configured to move the diaphragm blades; and a third driver configured to drive the driving member, wherein the third driver is disposed on the object side of the diaphragm base member.

9. The optical apparatus according to claim 6, wherein the controller controls the driving amount of the second driver, in a case where the first optical member and the second optical member are arranged most closely to each other.

10. The optical apparatus according to claim 7, wherein the first magnet and the second magnet are arranged so that the first magnet and the second magnet overlap each other in the direction perpendicular to the optical axis, and wherein the first coil and the second coil are arranged so that the first coil and the second coil overlap each other in the direction perpendicular to the optical axis.

11. The optical apparatus according to claim 8, wherein at least a part of the driving member overlaps the second optical member in the direction perpendicular to the optical axis, in a case where the first optical member and the second optical member are arranged most closely to each other.

\* \* \* \* \*